United States Patent Office

3,207,719
Patented Sept. 21, 1965

3,207,719
POLYVINYL CHLORIDE COMPOSITIONS CURED WITH TIN HALIDES
Moyer M. Safford, Schenectady, N.Y., assignor to General Electric Company, a corporation of New York
No Drawing. Filed June 5, 1963, Ser. No. 285,610
6 Claims. (Cl. 260—30.6)

This invention is concerned with making solid, infusible, insoluble, plasticized vinyl halide resins. More particularly, the invention relates to a process for rendering vinyl chloride resins plasticized with tricresyl phosphate, insoluble and infusible by heating the latter in the presence of a minor weight proportion of a tin halide selected from the class consisting of stannous chloride dihydrate ($SnCl_2.2H_2$) and stannic chloride ($SnCl_4$). The invention also embraces vinyl chloride resins capable of being rendered infusible and insoluble by the presence of the aforesaid tin chlorides, as well as the heat-treated products therefrom, to yield the cross-linked, that is, the infusible, insoluble vinyl chloride resins. For brevity, the aforesaid two tin chlorides will hereinafter be referred to as such.

Plasticized vinyl halide resins, for instance, plasticized polyvinyl chloride resins, have been employed extensively as insulation for electrical conductors. The use of such insulated conductors has been limited as far as temperature is concerned, to the point where the plasticized vinyl chloride resin begins to flow and thereby loses its ability to continue as insulation for the metallic conductor. Depending on the environmental conditions, this temperature at which the vinyl chloride resins cease to be useful as insulation is of the order of about 75 to 100° C. depending in great measure on the particular vinyl chloride resin and on the type and amount of plasticizer used with the vinyl chloride resin. Attempts have been made in the past to render vinyl chloride resins substantially infusible and insoluble. For the most part, these attempts have not been too successful. In the first place, the temperature at which these allegedly cross-linked vinyl chloride resins can be used has generally not been high enough. In addition, past cross-linking agents have required excessively long periods of time to effect the desired degree of infusibility and insolubility of the vinyl chloride resin. Furthermore, the degree and quality of cross-linking is often adversely affected when certain plasticizers are used with certain classes of cross-linking agents.

Unexpectedly, I have discovered that two tin chlorides, specifically, stannic chloride and stannous chloride dihydrate, can readily convert vinyl chloride resins to the substantially insoluble and infusible state, and that the amount of cross-linking agent needed for this purpose is relatively small, while the times required to effect this conversion to the insoluble, infusible state are acceptable for commercial utilization. I have also unexpectedly discovered that the strength of vinyl chloride resins rendered infusible and insoluble with these tin chlorides is advantageously better in kind when tricresyl phosphate is used as the plasticizer for the polyvinyl chloride than when similar plasticizers or more popular plasticizers are used for the purpose. Two of the more frequently used plasticizers for polyvinyl chloride resins are di-(2-ethylhexyl) phthalate and tricresyl phosphate. I have unpredictedly discovered that the above tin chloride give much better tensile strengths at temperatures of 125° C. or 150° C. with the tricresyl phosphate than is possible with the di-(2-ethylhexyl)phthalate (also called "dioctyl phthalate"). Even when phosphates similar to tricresyl phosphate were used, such as tri-(2-ethylhexyl)phosphate or tri-(n-butyl)phosphate or other commonly used plasticizers for vinyl chloride resins such as methyl pentachlorostearate, or tetrahydrofurfuryl oleate, were used with the aforesaid tin chlorides, the tensile strengths of the plasticized polyvinyl chloride at 150° C. were materially lower than when using the tin chlorides mentioned above, with tricresyl phosphate. Finally, it was also unexpectedly discovered that a very similar tin chloride, specifically the anhydrous stannous chloride, gave markedly inferior results, even when used with tricresyl phosphate as the plasticizer.

The vinyl chloride resins with which this invention is concerned include not only the homopolymers of vinyl chloride but also copolymers of vinyl chloride with other copolymerizable materials. Among such compositions are (1) vinyl chloride resins, such as, for example, polyvinylidene chloride, polyvinyl chloride resins (including the different molecular weight forms, e.g., gamma-polyvinyl chloride), chlorinated polyethylene (containing from 5 to 60% chlorine), chlorosulfonated polyethylene, chloroprene, etc; (2) vinyl resins produced by the conjoint polymerization of vinyl chloride and a vinyl ester of a lower saturated aliphatic monocarboxylic acid, e.g., vinyl acetate (such vinyl chloride-vinyl acetate copolymers being available under the trade name of Vinylite resins wherein the vinyl chloride component is present in a preponderant amount), vinyl propionate, vinyl butyrate, vinyl hexoate, vinyl acetobutyrate, vinyl chloroacetate, vinyl chloropropionate, etc., the term "lower saturated aliphatic monocarboxylic acid" preferably embracing acids containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of a vinyl halide, e.g., vinyl chloride, and a vinylidene halide, specifically vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be rendered infusible and insoluble with the above metal halides may be found in, for example, D'Alelio Patents 2,378,753, issued June 19, 1945, and 2,299,740, issued October 27, 1942, both of which are assigned to the same assignee as the present invention.

The amount of tin chloride which may be employed in the practice of this invention can be varied widely. Amounts as small as 0.1 percent of the tin chloride, based on the weight of the vinyl chloride resin can cause an increase in the fusion temperature and reduce the solubility of the vinyl chloride resin in solvents in which the normally thermoplastic vinyl chloride resin is soluble. Advantageously, I employ a minor proportion of the tin chloride, preferably from about 0.1 to about 10 percent, by weight, of the tin chloride, based on the weight of the vinyl chloride resin. The amount of the tin chloride used will depend on such factors as the application involved (electrical applications usually requiring smaller amounts of the tin chloride), the amount and type of other ingredients used with the vinyl chloride resins, such as heat and light stabilizers, pigments, fillers, etc., as well as the amount of the triescyl phosphate used. Ordinarily, no particular problem is involved in the amount of tricresyl phosphate used unless excessive amounts are employed. Preferably, the amount of tricresyl phosphate used may vary, on a weight basis from about 0.1 to 2 parts of the plasticizer per part of vinyl chloride resin. For many applications, the amount of the plasticizer (i.e., the tricresyl phosphate) employed may vary from about 20 percent to 80 percent by weight, based on the total weight of the vinyl chloride resin and the tricresyl phosphate.

Among the stabilizers which may be employed in the practice of the present invention may be mentioned, for instance, PbO, $Pb_2O_3$, $Pb_3O_4$, other lead compounds including those disclosed and claimed in Safford Patent 2,269,990, issued January 13, 1942, as well as the lead salt stabilizers disclosed in Safford Patent 2,455,879, issued December 7, 1948.

Among the fillers which may be employed are, for instance, carbon black, silica, barytes, zinc oxide, clay, wood flour, and other pigments or fillers commonly used in the rubber and plastics industries. The amount of filler can be varied widely and generally is within the range of from about 5 to 200%, by weight, of the total weight, of the total weight of the filler, plasticizer, and vinyl halide resin. Generally, on a weight basis, the filler is advantageously employed from about 0.1 to 2 parts of the latter per part of the vinyl halide resin Generally, in order to carry out the invention, it is only necessary to mix plasticizer with the tin chloride and this mixture is then dry blended with the vinyl chloride resin, which is then subjected to milling at temperatures of from 110–130° C. (preferably at 125° C.), incorporating at the same time any other modifying agents, such as those mentioned above, and thereafter heating the mixture of ingredients at temperatures in excess of 100° C. and advantageously ranging from about 130–170° C. for times ranging from 5 to 60 minutes or more, if desired, at pressures of from 100–1000 p.s.i.

In order that those skilled in the art may better understand how the present invention may be practiced, the following examples are given by way of illustration and not by way of limitation. All parts are by weight. In all cases, the vinyl chloride resin was solid gamma-polyvinyl chloride.

EXAMPLE 1

A homogeneous mixture was obtained on milling rolls from 60 parts polyvinyl chloride resin (obtained by polymerizing vinyl chloride in the usual fashion), and 40 parts of either tricresyl phosphate or a di-(2-ethylhexyl)phthalate. The use of the di-(2-ethylhexyl)phthalate was to show the advantages in kind to be derived from using the tricresyl phosphate as the plasticizer over the di-(2-ethylhexyl)phthalate as the plasticizer. Samples of these formulations were made up in which 2 parts of either stannic chloride, or anhydrous stannous chloride, or stannous chloride dihydrate, was incorporated in each of the formulations in the manner described above. As a control, mixtures of the polyvinyl chloride resin and each of the two plasticizers without tin chlorides were also prepared. Each of the samples both with and without the tin chlorides, was pressed at a temperature of 150° C. at a pressure of about 500 p.s.i. for 30 minutes into the form of sheets, and these sheets were then tested for physical properties at 150° C. Table I below shows the properties of the molded samples at the aforesaid test temperature.

*Table I*

| Sample No. | Tin chloride | Plasticizer | Tensile, p.s.i. | Percent elongation |
|---|---|---|---|---|
| 1 | Control [1] | Tricresyl phosphate | 30 | |
| 2 | ------do------ | Di-(2-ethyhexyl)-phthalate. | 40 | |
| 3 | $SnCl_2.2H_2O$ | Tricresyl phosphate | 347 | 110 |
| 4 | $SnCl_4$ | ------do------ | 400 | 130 |
| 5 | $SnCl_2$ (anhydrous). | ------do------ | 253 | 100 |
| 6 | $SnCl_2.2H_2O$ | Di-(2-ethylhexyl)-phthalate. | 284 | 175 |
| 7 | $SnCl_4$ | ------do------ | 245 | 250 |
| 8 | $SnCl_2$ (anhydrous). | ------do------ | 275 | 140 |

[1] No tin chloride.

It will be noted that the stannic chloride and the stannous chloride dihydrate with the tricresyl phosphate as plasticizer gave improvements in kind in the tensile strength of the heat-converted polyvinyl chloride over the use of the same metal chlorides with the di-(2-ethylhexyl)phthalate as the plasticizer. It will also be noted that contrary to what might have been predicted, the anhydrous stannous chloride with either the tricresyl phosphate or di-(2-ethylhexyl)phthalate as the plasticizer gave inferior tensile strengths as contrasted to results obtained using the other tin chlorides, namely, the stannic chloride and the stannous chloride dihydrate, with the tricresyl phthalate.

EXAMPLE 2

As further evidence of the unexpected advantages of the use of the stannic chloride and the stannous chloride dihydrate with tricresyl phosphate, the same heat-treated samples of Example 1 were tested for tensile strength and percent elongation at 125° C., with the results shown in the following Table II.

*Table II*

| Sample No. | Tin chloride | Plasticizer | Tensile, p.s.i. | Percent elongation |
|---|---|---|---|---|
| 9 | Control [1] | Tricresyl phosphate | 110 | |
| 10 | ------do------ | Di-(2-ethylhexyl)-phthalate. | 80 | |
| 11 | $SnCl_2.2H_2O$ | Tricresyl phosphate | 534 | 240 |
| 12 | $SnCl_4$ | ------do------ | 570 | 250 |
| 13 | $SnCl_2$ (anhydrous). | ------do------ | 372 | 150 |
| 14 | $SnCl_2.2H_2O$ | Di-(2-ethylhexyl) phthalate. | 383 | 235 |
| 15 | $SnCl_4$ | ------do------ | 277 | 170 |
| 16 | $SnCl_2$ (anhydrous). | ------do------ | 382 | 150 |

[1] No tin chloride.

EXAMPLE 3

It was also noted that the presence of a tin chloride of the class employed in the practice of the present invention, specifically stannic chloride, in polyvinyl chloride plasticized with tricresyl phosphate, gave tensile strengths at room temperature (30° C.) which were materially greater than the tensile strengths of the tricresyl phosphate plasticized polyvinyl chloride without the stannic chloride, or polyvinyl chloride plasticized with di-(2-ethylhexyl)phthalate, again without any stannic chloride. Thus, one formulation was prepared from 40 parts tricresyl phosphate and 60 parts polyvinyl chloride; and another formulation was prepared from 60 parts polyvinyl chloride and 40 parts di-(2-ethylhexyl)phthalate. To each of these formulations was added two parts stannic chloride. Each mixture of ingredients was then heated for 30 minutes at 150° C. at a pressure of about 500 p.s.i., and thereafter the samples were tested at room temperature for tensile strength and elongation with the following results as shown in Table III.

*Table III*

[Tested at 30° C.]

| Sample No. | $SnCl_4$ | Plasticizer | Tensile, p.s.i. | Percent elongation |
|---|---|---|---|---|
| 17 | None | Tricresyl phosphate | 3,087 | 289 |
| 18 | Yes | ------do------ | 3,666 | 173 |
| 91 | Yes | Di-(2-ethylhexyl)phthalate | 2,950 | 195 |

EXAMPLE 4

The unpredictability of being able to effect cross-linking of vinyl chloride resins by means of either the stannic chloride or the stannous chloride dihydrate described above is illustrated by the fact that when one employed other metallic halides which might be expected to be equally as effective, for instance, 2 parts aluminum trichloride or 2 parts boron trifluoride, in place of the 2 parts tin chlorides used in Sample No. 18 of Example 3, the results were as shown in Table IV below.

sheets for 30 minutes at 150° C. at above 500 p.s.i., the tests being carried out both at room temperature (30° C.) and at 150° C.

*Table V*

| Filler | Tested at room temperature (30° C.) | | | | Tested at 150° C. | | | |
|---|---|---|---|---|---|---|---|---|
| | No SnCl₄ | | With 2 parts SnCl₄ | | No SnCl₄ | | With 2 parts SnCl₄ | |
| | Tensile, p.s.i. | Percent elongation | Tensile, p.s.i. | Percent elongation | Tensile, p.s.i. | Percent elongation | Tensile, p.s.i. | Percent elongation |
| Clay: | | | | | | | | |
| 0 parts | 3,090 | 290 | 3,325 | 190 | 53 | 120 | 365 | 190 |
| 10 parts | 2,680 | 220 | 3,110 | 135 | 56 | 110 | 315 | 130 |
| 20 parts | 2,640 | 160 | 3,150 | 100 | 47 | 75 | 330 | 120 |
| 40 parts | 2,360 | 130 | 2,740 | 80 | 77 | 75 | 340 | 120 |
| Santocel C: | | | | | | | | |
| 0 parts | 3,090 | 290 | 3,325 | 190 | 53 | 120 | 365 | 190 |
| 10 parts | 3,420 | 115 | 4,000 | 90 | 67 | 30 | 350 | 100 |
| 20 parts | 4,475 | 90 | 4,470 | 80 | 120 | 50 | 435 | 90 |
| 40 parts | 4,970 | 60 | 4,960 | 75 | 150 | 80 | 640 | 100 |
| Thermax: | | | | | | | | |
| 0 parts | 3,090 | 290 | 3,325 | 190 | 53 | 120 | 365 | 190 |
| 10 parts | 3,060 | 150 | 3,320 | 180 | 44 | 70 | 340 | 115 |
| 20 parts | 3,160 | 115 | 3,740 | 110 | 47 | 60 | 350 | 120 |
| 40 parts | 3,280 | 90 | 3,270 | 100 | 29 | 10 | 495 | 145 |

*Table IV*

| Sample No. | Metal halide | Physicals tested at 30° C. | | Physicals tested at 150° C. | |
|---|---|---|---|---|---|
| | | Tensile, p.s.i. | Percent elongation | Tensile, p.s.i. | Percent elongation |
| 20 | AlCl₃ | 2,977 | 200 | 48.9 | 118 |
| 21 | BF₃ | 3,217 | 235 | 88.1 | 129 |

EXAMPLE 5

This example illustrates the effect of using various fillers with the plasticized polyvinyl chloride. More particularly, a basic formulation was prepared from 60 parts polyvinyl chloride and 40 parts tricresyl phosphate. To samples of this formulation were added varying amounts of clay, silica aerogel (Santocel C manufactured by Monsanto Chemical Company), and carbon black (specifically Thermax sold by Cabot Company). The amount of filler was varied in several instances; samples were also prepared in which 2 parts stannic chloride was added to filled and unfilled mixtures of the polyvinyl chloride and tricresyl phosphate. The following Table V shows the parts of filler which were used in each instance in addition to the presence of the initial 60 parts polyvinyl chloride and 40 parts tricresyl phosphate. Table V also shows the results of tests for tensile strength and elongation on samples molded into sheets for 30 minutes at 150° C. at above 500 p.s.i., the tests being carried out both at room temperature (30° C.) and at 150° C.

EXAMPLE 6

In this example, the same type of fillers as were used in Example 5 were incorporated in a mixture of 60 parts polyvinyl chloride and 40 parts di-(2-ethylhexyl)phthalate, both with and without 2 parts SnCl₄. The same curing cycle and tests for physical properties were conducted on the molded samples as was done in Example 5. The following Table VI shows the results of these tests, the amount of filler shown being in parts, by weight, in addition to the 60 parts polyvinyl chloride and 40 parts di-(2-ethylhexyl)phthalate. It will be noted that the results are markedly inferior to those obtained using SnCl₄ with tricresyl phosphate as the plasticizer in the filled polyvinyl chloride.

*Table VI*

| Filler | Tested at room temperature (30° C.) | | | | Tested at 150° C. | | | |
|---|---|---|---|---|---|---|---|---|
| | No SnCl₄ | | With 2 parts SnCl₄ | | No SnCl₄ | | With 2 parts SnCl₄ | |
| | Tensile, p.s.i. | Percent elongation | Tensile, p.s.i. | Percent elongation | Tensile, p.s.i. | Percent elongation | Tensile, p.s.i. | Percent elongation |
| Clay: | | | | | | | | |
| 0 parts | 2,420 | 320 | 2,500 | 210 | 38 | 140 | 155 | 160 |
| 10 parts | 2,170 | 165 | 2,360 | 150 | 59 | 80 | 160 | 130 |
| 20 parts | 2,090 | 145 | 2,395 | 130 | 55 | 70 | 185 | 150 |
| 40 parts | 1,930 | 105 | 2,170 | 100 | 60 | 60 | 190 | 130 |
| Santocel C: | | | | | | | | |
| 0 parts | 2,420 | 320 | 2,500 | 210 | 38 | 140 | 155 | 160 |
| 10 parts | 2,300 | 125 | 2,765 | 150 | 50 | 55 | 170 | 170 |
| 20 parts | 2,980 | 95 | 2,840 | 95 | 88 | 50 | 140 | 120 |
| 40 parts | 3,720 | 90 | 3,440 | 60 | 73 | 20 | 150 | 100 |
| Thermax: | | | | | | | | |
| 0 parts | 2,420 | 320 | 2,500 | 210 | 38 | 140 | 155 | 160 |
| 10 parts | 2,280 | 140 | 2,460 | 155 | 33 | 65 | 165 | 215 |
| 20 parts | 2,220 | 110 | 2,610 | 125 | 42 | 80 | 175 | 125 |
| 40 parts | 2,090 | 95 | 2,900 | 90 | 66 | 70 | 160 | 100 |

EXAMPLE 7

In order to show the specificity of the tin chlorides with tricresyl phosphate as the plasticizer, other formulations were prepared and cured similarly as was done in the previous examples using two types of plasticizers quite closely related to tricresyl phosphate, and the physical properties of such cured samples were determined at 150° C. The basic formulation comprised 60 parts polyvinyl chloride, 2 parts of either stannous chloride dihydrate or stannic chloride, and 40 parts of the respective plasticizer used. Each formulation was heated for 30 minutes at 150° C. at a pressure of 500 p.s.i. to yield sheets which were tested at 150° C. for tensile strength and percent elongation with the results described in Table VII.

Table VII

| Sample No. | Plasticizer | Tensile, p.s.i. | Percent elongation |
|---|---|---|---|
| 22 [1] | Tri(2-ethylhexyl)phosphate | 41.9 | 60 |
| 23 [2] | ----do---- | 55.0 | 95 |
| 24 [1] | Tri(n-butyl)phosphate | 47.0 | 128 |
| 25 [2] | ----do---- | 52.6 | 165 |

[1] Curing agent $SnCl_4$.   [2] Curing agent $SnCl_2 \cdot 2H_2O$.

It will of course be apparent to those skilled in the art that the vinyl chloride resin used can be varied widely, many examples of which have been given above and no intent should be read into the above description to limit this particular aspect of the claimed invention. Finally, the proportions of ingredients used as well as the other modifying ingredients and conditions under which the curing is carried out may be varied within wide limits as is clearly pointed out above.

Compositions of the present invention rendered substantially infusible and insoluble can be obtained by various means including extrusion, injection molding, flame spraying, plasma spraying, compression molding, plastisol techniques (e.g., by dipping or slush molding), etc., using adequate heating means for effecting conversion of the originally thermoplastic plasticized vinyl halide resin to the thermoset and infusible state. These compositions can be used as insulation for electrical conductors and can also be used in the preparation of tapes, varnishes (wherein the potentially infusible and insoluble composition with the tin chloride is dissolved in a suitable solvent and after application to the desired surface is heated at elevated temperatures to effect conversion to the infusible and insoluble state), as adhesives, as castings, laminated products, etc. The compositions herein described and claimed can be used for encapsulating electrical components which will be required to have resistance to elevated temperatures, moisture and to solvents.

What I claim as new and desire to secure by Letters Patent of the United States is:

1. A heat-treated composition of matter containing as essential ingredients (1) polyvinyl chloride plasticized with tricresyl phosphate which is present, by weight, in an amount equal to from 0.1 to 2 parts of the tricresyl phosphate per part of the polyvinyl chloride, and (2) a tin chloride selected from the class consisting of stannic chloride and stannous chloride dihydrate wherein the tin chloride is present in an amount sufficient to enhance the cross-linking of the polyvinyl chloride.

2. A heat-treated composition of matter containing as essential ingredients (1) polyvinyl chloride plasticized with tricresyl phosphate which is present, by weight, in an amount equal to from 0.1 to 2 parts of the tricresyl phosphate per part of the polyvinyl chloride, and (2) from 0.1 to 10 percent, by weight, based on the weight of the polyvinyl chloride, of stannic chloride.

3. A heat-treated composition of matter containing as essential ingredients (1) polyvinyl chloride plasticized with tricresyl phosphate which is present, by weight, in an amount equal to from 0.1 to 2 parts of the tricresyl phosphate per part of the polyvinyl chloride, and (2) from 0.1 to 10 percent, by weight, based on the weight of the polyvinyl chloride, of stannous chloride dihydrate.

4. A heat-treated composition of matter as in claim 1 wherein the composition of matter has a filler of silica aerogel.

5. A heat-treated composition of matter as in claim 1 wherein the composition of matter has a filler of carbon black.

6. A heat-treated composition of matter as in claim 1 wherein the composition of matter has a filler of clay.

References Cited by the Examiner

UNITED STATES PATENTS

| | | | |
|---|---|---|---|
| 2,117,591 | 5/38 | Alexander | 260–92.8 |
| 2,159,997 | 5/39 | Brous | 260–92.8 |
| 3,091,597 | 5/63 | Henriques | 260–41 |

MORRIS LIEBMAN, *Primary Examiner.*